United States Patent
Anderson et al.

(10) Patent No.: US 6,694,249 B1
(45) Date of Patent: Feb. 17, 2004

(54) INTEGRATED SURFACE MOVING MAP ADVISORY SYSTEM

(75) Inventors: Eric N. Anderson, Cedar Rapids, IA (US); Matthew J. Carrico, Mount Vernon, IA (US); Julie L. Garloch, Cedar Rapids, IA (US); James F. Winfield, North Liberty, IA (US); Steven M. Zellers, North Liberty, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/044,600

(22) Filed: Jan. 11, 2002

(51) Int. Cl.[7] .............................................. G06F 19/00
(52) U.S. Cl. ....................... 701/120; 701/301; 701/207; 340/947; 342/29
(58) Field of Search ........................ 701/120, 13, 301, 701/9, 3, 4, 207, 14; 340/961, 933, 479, 435; 342/29, 36, 933, 961, 456; 244/3.19, 870.44

(56) References Cited

U.S. PATENT DOCUMENTS

| 5,519,618 | A | * | 5/1996 | Kastner et al. | ............. 701/120 |
|---|---|---|---|---|---|
| 5,629,691 | A | * | 5/1997 | Jain | ............................ 340/961 |
| 6,163,309 | A | * | 12/2000 | Weinert | .......................... 345/7 |
| 6,314,370 | B1 | * | 11/2001 | Curtright | .................... 701/213 |
| 2002/0116126 | A1 | * | 8/2002 | Lin | ............................ 701/214 |
| 2003/0045994 | A1 | * | 3/2003 | Stratton et al. | ............. 701/120 |

OTHER PUBLICATIONS

Pending patent application Docket No. 00FD001/KE, Application No. 09/602,352 entitled "Airport Surface Operation Advisory System" with a filing dated of Jun. 23, 2000, inventor W. Johnson et al. and now patent No. 6,571,166.

* cited by examiner

Primary Examiner—Thomas G. Black
Assistant Examiner—Tuan C To
(74) Attorney, Agent, or Firm—Nathan O. Jensen; Kyle Eppele

(57) ABSTRACT

An integrated surface moving map advisory system that provide selectable amounts of simplified airport layout information, simultaneously with authorized ground movement authority in order to provide highly informative and intuitive guidance with respect to all aspects of operating an aircraft or other vehicle in a controlled geographical area. The advisory system may be further enhanced by the additional overlay of symbols representing other airport traffic along with the general intentions of such traffic.

19 Claims, 5 Drawing Sheets

INTEGRATED SURFACE MOVING MAP ADVISORY SYSTEM

BACKGROUND OF THE INVENTION

This invention relates to traffic management systems, and more particularly, a surface operation advisory system and specifically to an integrated surface moving map advisory system for use in controlled, traffic management systems such as those at ground control operations at airports.

A variety of apparatus and methods are known and in use in the control of surface operations at airports. Typical airport operations consist of a combination of runways, taxiways, and tarmac areas that support safe and efficient airport operation. Active runway management is generally under separate control from taxiway and tarmac operations. At major airports that serve dozens of daily flights a plurality of active runways and numerous taxiways may have to be traversed when maneuvering an aircraft from a parked location to its departure runway, and similarly upon landing an aircraft on an active runway and subsequently taxing to an assigned parking location. During high traffic times inefficient ground operations can significantly affect the departure and arrival activity by all user aircraft. Additionally, significant safety issues are present when numerous aircraft are operating in a relatively confined area under time constraints. This situation can be even more challenging when poor visibility exists because of meteorological conditions, twilight or nighttime operations, obscuration of signage and ground paint marking, unfamiliarity by aircraft operators of the airport layout, or other relevant factors. Additionally, local markers which provide visual guidance have inherent limitations with respect to the viewing angle by a pilot, dependent upon any given aircraft size and windshield design.

Existing systems address the needs of airport ground operations through a combination of verbal communications from ground control to aircraft operators that have on-board detailed diagrams of the airport layout and the use of datalinks. Such on-board diagrams may be either paper products or electronically displayed information that typically contain highly detailed depictions of the airport operating area. In order to quickly and effectively utilize such on-board diagrams a cockpit crew member must direct his visual focus from outside the aircraft to the schematic aid inside the cockpit, orient the instantaneous location of the aircraft, and interpret the movement authority offered by the controller as expeditiously as possible. Accordingly, there are frequent instances of delays in the movement of aircraft on the ground while the flight crew interprets controller instructions, the present aircraft location and the authorized path to the desired destination. Additionally, it is not uncommon for aircraft operating on the ground to unintentionally deviate from an assigned route of travel and/or to fail to observe all interim holds or stops between its point of origin and final surface destination.

Head Up Displays (HUDs) are well known in the aviation industry and are actively used during certain flight operations to convey aircraft performance and flight critical information without requiring a pilot to divert attention from outside the aircraft. A typical HUD includes a transparent display, within the pilot's typical forward view that includes a variety of symbols and numbers to assist flight operations. A HUD based surface guidance system, such as described in pending U.S. patent application Ser. No. 09/602,352, addresses aircraft airport surface operations from the perspective of the instantaneous operation of the aircraft with a view outside the cockpit, but is lacking with respect to in-depth route planning, general airport surface information or additional traffic or ground operation considerations.

Modern aircraft operating with updated avionics may contain a variety of precise position location systems, including satellite based location systems such as the Global Positioning System and terrestrial based systems, such as LORAN that in conjunction with widely available computer processing capability can readily provide present location with respect to the earth's surface. Such systems can be enhanced with the inclusion of additional correction signals, as found in a Differential GPS system that provide increased position determination accuracy, or by the inclusion of electronic geographic databases. Additionally, aircraft that include flight management systems and one or more electronic displays may be configured to provide aircraft position and situational awareness information to the aircraft flight crew.

Although studies have been undertaken for an improved ground operation system that would incorporate existing displays, such proposed systems lack intuitive and simplified characteristics that can provide timely and relevant information, while simultaneously integrating known surface features and varying traffic operation considerations to support safe and efficient runway occupancy and ground movement airport operations.

SUMMARY OF INVENTION

The present invention relates to an integrated surface moving map advisory system configured for use in ground, approach, or takeoff operations. A head down display (HDD) system is disclosed which comprises a signal processor including a symbol generator, a controller for inputting movement authority by the flight crew and access to an electronic geographical database comprising critical geo-location information of multiple airport layouts, including but not limited to runways, taxiways, run-up, parking and permanent structure locations, that in combination monitor location of the vehicle with respect to a given reference system, such as the earth's surface and provide guidance with respect both to desired present location and eventual destination. The guidance information contains generated symbols that are presented to the flight crew, in selectable fashion for viewing on the HDD. The HDD may depict, at any one time, the entire airport operating area or selected segments relevant to the aircraft's intended route of travel or phase of flight. Selecting varied amounts of information to be symbolically represented in a manner consistent with airborne routing information based on selected display range provides the flight crew with additional guidance and surface detail information, as determined appropriate by the flight crew. When operating in a region with vehicles equipped with Automatic Dependent Surveillance—Broadcast (ADS—B) equipment and when the aircraft has cockpit display of traffic information capability of such ADS—B traffic information and is equipped to receive such ADS—B information, the movement of all participating ADS—B local traffic may be overlaid on the HDD ground routing schematic to enhance ground movement of the aircraft.

It is an object of the present invention to improve airport-operating efficiency and improve runway occupancy awareness.

It is a feature of the present invention to incorporate ground traffic clearance information to the flight crew operating an aircraft on the ground between departure or arrival runways and ultimate parking location.

It is an advantage of the present invention that aircraft utilizing such a surface operation control system minimize movement delays due to clearance confusion, blocked or obscured flight crew view of the adjacent and approaching aircraft ground track, or unfamiliarity with local conditions.

It is an additional advantage of the present invention that aircraft utilizing such a surface operation control system increases safety due to increased runway occupancy awareness on approach or departure.

These and other objects, features, and advantages are disclosed in the specification, figures, and claims of the present invention.

DETAILED DESCRIPTION

Figure 1:
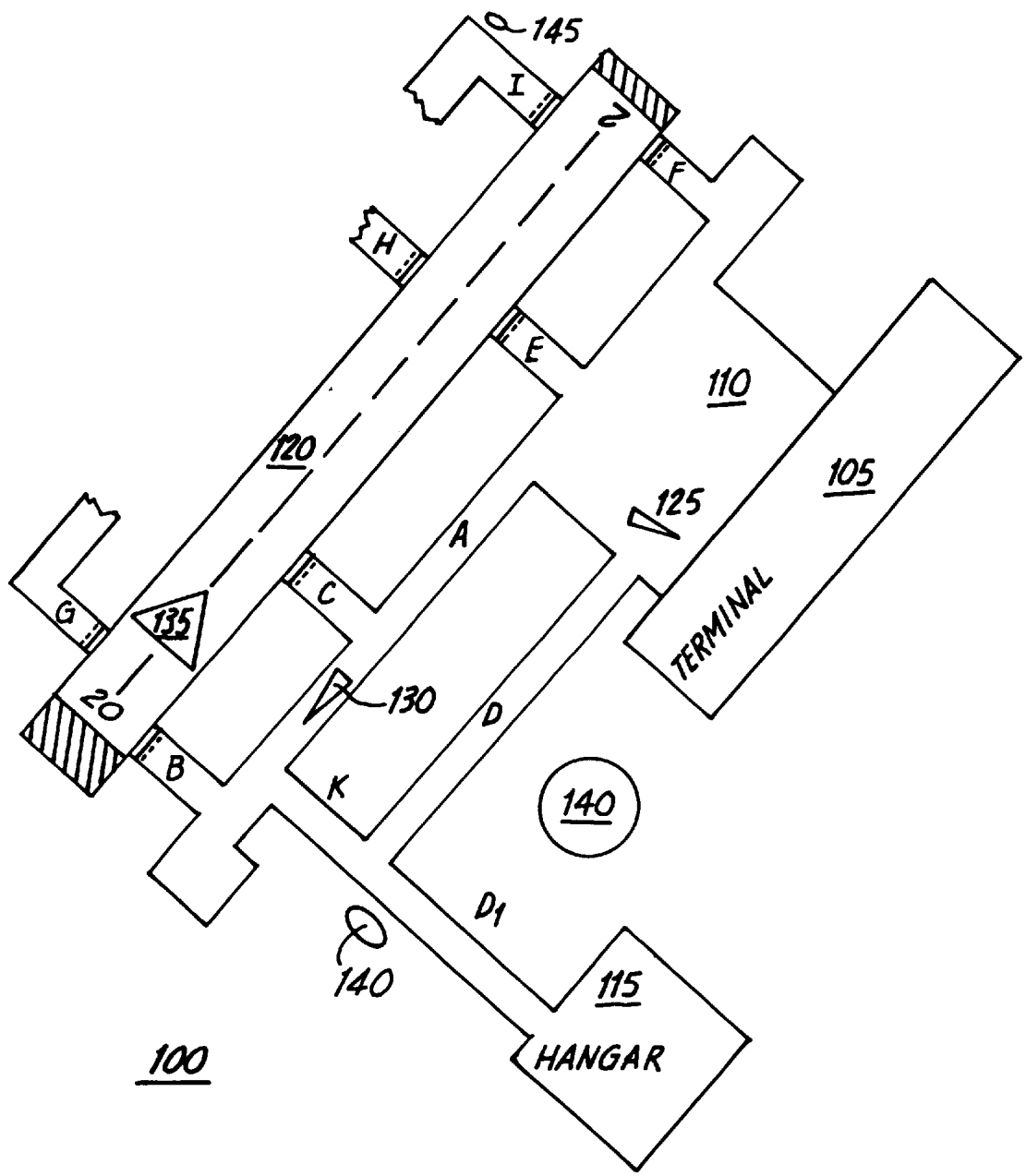
FIG. 1 is a diagrammatic view of a representative simplified airport layout with aircraft and support vehicles that incorporate the teachings of the present invention.

Referring now to the drawings wherein like numerals refer to like matter throughout, FIG. 1 shows a representative simplified airport area 100 having aircraft and other vehicles which incorporate the teachings of the present invention. As depicted, the airport area 100 is comprised of a terminal building 105 that has an immediately adjacent tarmac area 110 for the movement of and parking of aircraft while aircraft are loading and unloading passengers, receiving minor service support or parked in a short term transient status, such as overnight parking. Also located on the airport area 100 is a hangar 115 for the permanent parking and providing extensive maintenance and inspection of aircraft. A runway 120 is coupled to both the hangar 115 and the terminal 105 by a series of taxiways, denoted as segments A, B, C, D, D1, E, F, and K. Additional taxiways G, H, and K are shown which could connect to any combination of items such as alternate runways, fixed base operation facilities, military hangars and parking, general aviation parking areas, or the like as may depict an existing or future airport layout. Aircraft 125, parked at the terminal 105, aircraft 130 located on taxiway A and aircraft 135, located on runway 120 are each equipped with the system of the present invention. Surface support vehicles 140, 145 are equipped with position broadcast devices, such as an ADS—B device compatible with similar equipment on the aircraft 125, 130, and 135 and with ground control operations. Aircraft movement is controlled by verbal and/or data authorizations issued by the control authority, such as the FAA in the United States, whom are typically located at a support facility 140. It is understood that depending upon airport operation complexity and size, the respective controllers may be located at more than one facility or even located at a remote airport location. In order for an aircraft to move from the active runway 120 to the terminal 105, authorization is received by the flight crew from the ground controller for the aircraft to follow a predetermined route of travel. Such an example of taxi instructions might be that aircraft 125 is cleared to taxi to runway 120 via taxiway A to B and to hold short of the runway 120. Typical airport operations include different individuals controlling ground movement operations and the active runway(s) operation. Ground markings, generally a series of parallel yellow stripes, such as 150, 150', 150" in addition to alphanumeric signage denote boundaries between taxiways and runways. Flight crews must observe and adhere to such boundaries in order to avoid straying into the path of other vehicles which have received alternate movement instructions from a cognizant controller.

Figure 2:
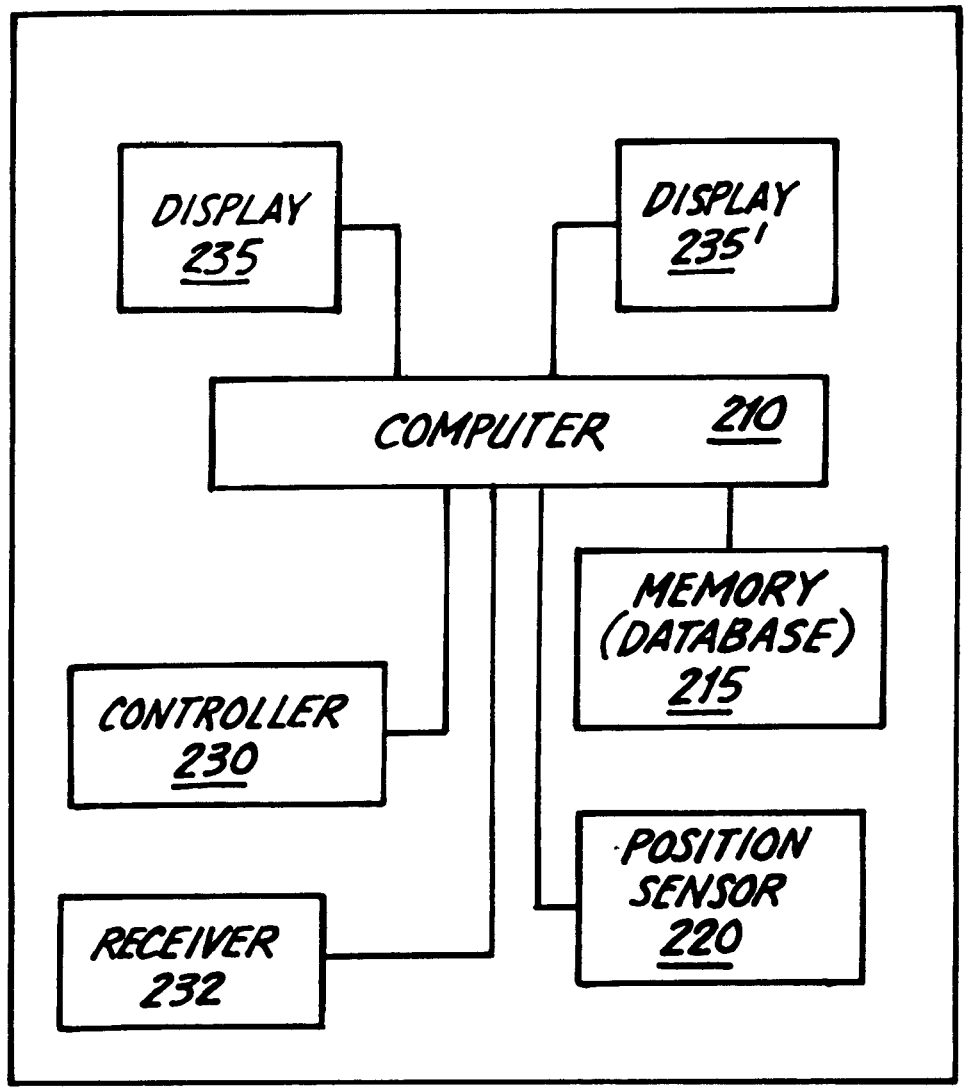
FIG. 2 is a block diagram of an integrated surface moving map advisory system of the present, having an optional capability with respect to ADS—B data.

FIG. 2 depicts a block diagram one embodiment of the integrated surface moving map advisory system 200 of the present invention. The system 200 is comprised of a computer 210, an electronic database 215, a position location device 220, an input controller 230, and at least one display 235 (235'). It is understood that the computer 210 could take the form of a flight management system device, modified to include an appropriate executable software program and associated configuration to support the requirements of the integrated surface moving map advisory system of the present invention. Alternatively, the computer 210 could take the form of a stand-alone device or utilize the computing capability of other existing devices already in existence on a particular aircraft. An electronic database 215 preferably containing numerous airport layouts, but at a minimum having the electronic data representing the airport of the current aircraft location is provided to the system either by the inclusion of an on-board dedicated memory device that stores and can readily retrieve such airport layout information, or alternatively by the use of a transmitted electronic airport layout, provided in wireless fashion to the aircraft and in a compatible format for use on the integrated surface moving map advisory system 200. A position detection device 220 is coupled to the computer 210 to provide instantaneous position information relative to the aircraft on which the device is mounted and the surface of the earth. When coupled with the airport database information 215, the combination of position information and the airport layout provides an observer easily understood visual information concerning relative position when illuminated upon a display such as 235 or 235'. It is understood that throughout this document unless otherwise indicated, that reference to display 235 could also be accomplished by utilization of display 234'.

An input controller 230 is also included in the integrated surface moving map advisory system and is electronically coupled to the computer 210 for the receipt and processing of movement authority information via the computer. The input controller 230 may take the form a traditional manually operated controller or may be a datalink device or both. Additionally, a receiver 232 may be included in the integrated surface moving map advisory system and can be configured for the receipt and for the reporting to the system 200 of the instantaneous position of ADS—B equipped vehicles within the airport traffic area.

Figure 3:
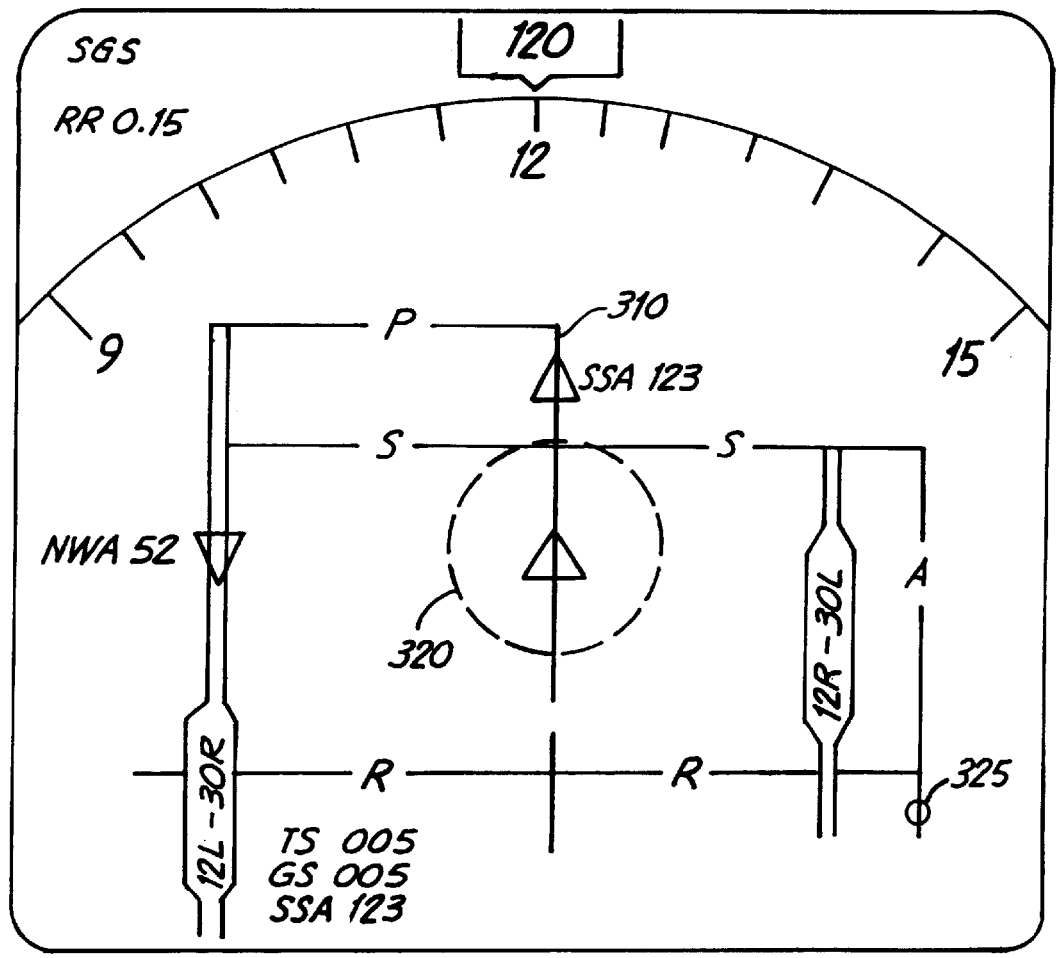
FIG. 3 is a first diagrammatic illustration of a head down display system displaying one embodiment of the present invention, having a first selection with respect to the range of desired information to be displayed.

FIG. 3, depicts one illustration of an instantaneous view on display 235, with a first selected range of detail, when the display 235 is operating to display the integrated surface moving map advisory information. The utilization of a visual cue, such as the letters "SGS" located in the upper left corner of the display screen informs an observer that the display is operating in ground system mode of operation. The authorized taxi route for aircraft SSA 123 is depicted as a simplified plurality of lines, which are preferably color coded to aide in visual interpretation. The authorized taxi route connects the aircraft SSA 123 from its previous position (such as terminal parking, or landing) to its desired destination. The taxi route segments are utilized to illustrate and provide visual guidance concerning mandatory stop and holds for further clearance from the controller. A magnetic heading, 120 is included at the top center of the display consistent with standard formats for flight movement authority and provides the instantaneous magnetic heading of the aircraft. The aircraft is depicted by a triangle icon with the front of the aircraft and direction of forward travel as indicated by the tip of 310 of the aircraft icon. A range ring scale 320 is utilized to aid in flight crew situational awareness. Selected display range is one method of providing varying amounts of information and respective detail consistent with either automatic or crew selected preferences. The annunciation of the setting for the range ring is provided by the "RR 0.15" symbol in the upper left corner of the display. It is understood that an alternate range ring selection would equate to a different variable identifier. Contemporaneous airport traffic are represented, in the case of aircraft, by a triangle labeled with their respective flight identifiers, such as NWA 52, representative of Northwest Airlines Flight 52 operating on runway 30R, and any other relevant aircraft information (e.g., ground speed, aircraft type). A surface support vehicle is represented by a small circle 325 providing approximate vehicle location.

Figure 4:
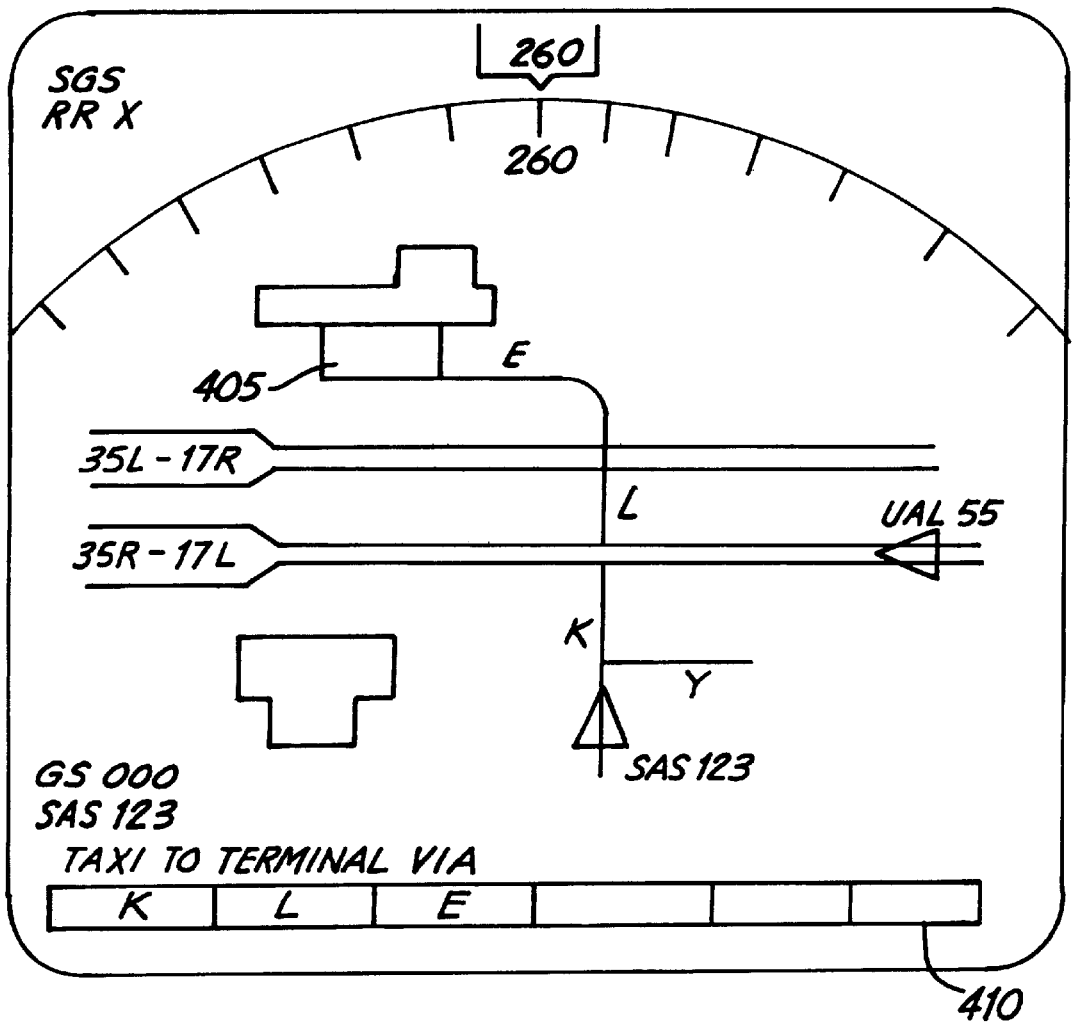
FIG. 4 is a second diagrammatic illustration of a head down display system of the present, having a second selection with respect to the type of desired information to be displayed.

FIG. 4 depicts an alternate representative display scene on HDD 235. As shown, the display now depicts dual parallel runways, a tarmac 405, taxiways, and other permanent structures. The taxiway identifiers are again shown as a plurality of alphanumerics Y, K, L, and E. The aircraft heading is again presented at the top of the screen and is representative of the current magnetic heading of the aircraft, "260". Other aircraft are again depicted by their unique flight identifier numbers and associated symbols, such as UAL 55, which represents United Airlines Flight 55. Additional information concerning authorized taxi information is provided on the task bar 410 located at the bottom of the display screen. As with the illustration of FIG. 3, color coding of the information may be provided to emphasize the nature of the displayed information.

Figure 5:
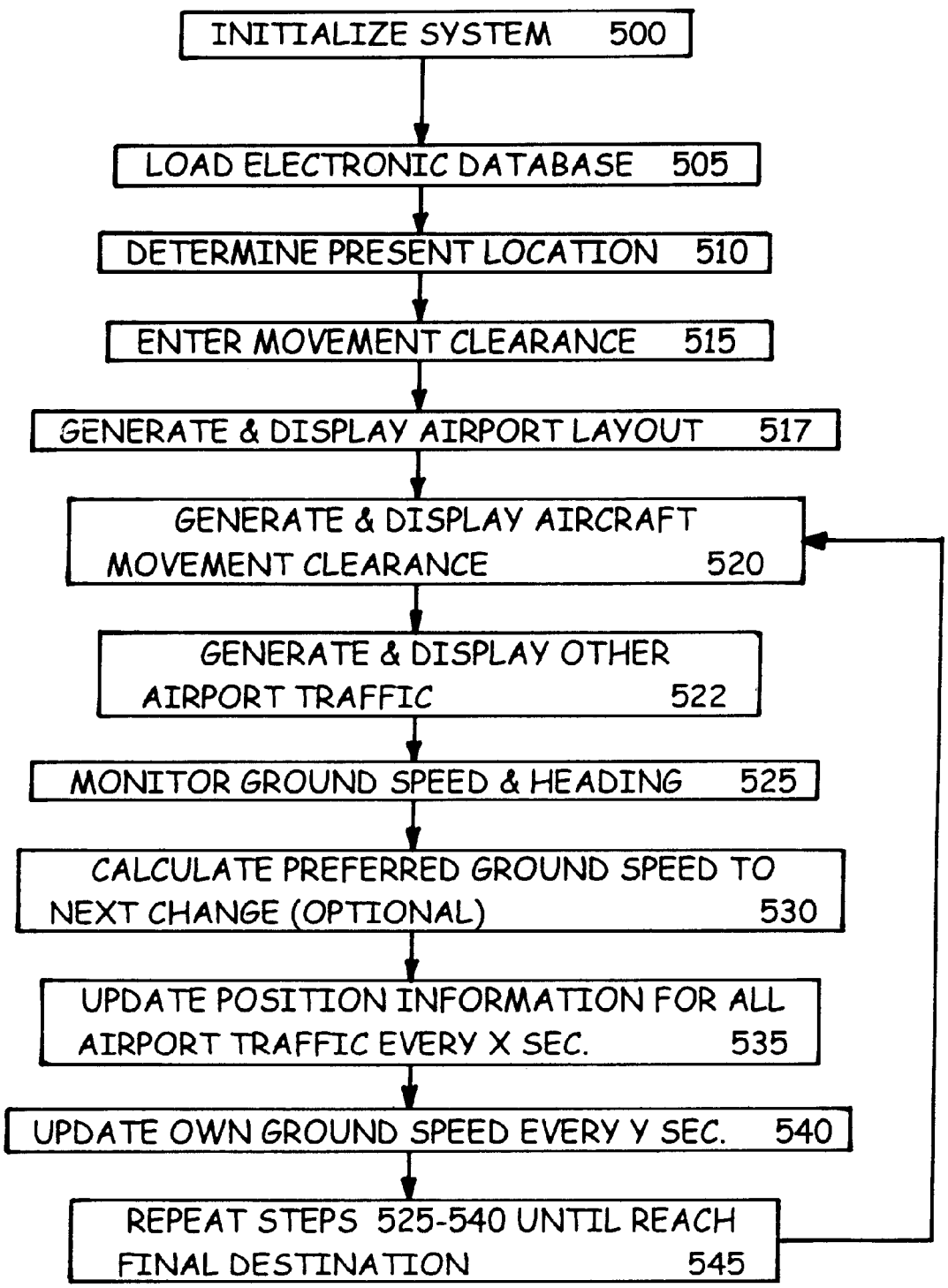
FIG. 5 is a flow diagram of one implementation of the method of displaying selected relevant airport surface operation information described in the present invention.

FIG. 5 represents a flow diagram of the steps completed by the present invention in one embodiment of normal operation. As a first step 500, the on-board computer system, which incorporates a combination of hardware, and software which implements the steps of FIG. 5, initializes its relevant operating system. The next step 505 of the disclosed method would be the loading of pertinent application software and electronic data. Pertinent electronic geographical information can be obtained from vendors such as Jeppesen Sanderson, Inc. or may be provided to the system by a wireless based airport transmitter.

Once the system is initialized and has accessed the relevant geographical database, the present aircraft location must be determined, step 510. This step can be accomplished manually, or automatically, via a satellite-based system, such a GPS or a terrestrial based geo-positioning system. Step 515 requires the entering of the taxing or movement clearance either via datalink or by a member of the aircraft flight crew into the system. This step is accomplished utilizing either an alphanumeric keypad, voice, touch screen, datalink or other well-known computer data input device.

The next step 520 requires the generation and display of guidance symbols to be displayed on the display screen of the system.

In order to provide relevant information, an input signal that provides current aircraft ground speed and heading must be provided to the system and updated, step 525. In addition to actual ground speed, the present invention allows for the computation and display of a target speed, such as a desired turn speed to assist the pilot in maintaining a predetermined maximum lateral acceleration for passenger comfort consideration or other speed limit constraints (such as for an upcoming taxi hold), step 530. The target speed may be represented by any variety of symbols one example of which is the "TS 005" shown in FIG. 3. Speed error is defined as the excess between the current speed and the target speed. A speed error indicator appears when a given threshold value is exceeded and may take the form of a change in color, boldface, flashing or other visual cue of the ground speed indicator to alert the aircraft crew of the overspeed condition. Once displayed, the speed error indicator continuously indicates an excess speed condition until the aircraft future position is reached or the speed is appropriately reduced. Step 535 provides that the system update all airport traffic at a selected time frequency X, such as every two seconds. Similarly, step 540 requires that the ground speed of the aircraft be updated at a frequency of Y, such as every one second. It is understood that the value for the variables X and Y are subject to design preference and could be equal in value.

Upon completion of an authorized route segment, such as to an interim "hold" position, the system calculates and displays the next movement guidance segment, step 545 by repeating steps 525–540 continuing in such fashion until the aircraft arrives at its ultimate ground destination.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

We claim:

1. A system for providing airport surface operation information to an aircraft cockpit flight crew member, comprising:

a display including a symbol generator mounted in the aircraft, a computer on-board the aircraft coupled to the display, a position determination device mounted in the aircraft and coupled to the computer that provides information of the aircraft position with respect to the surface of the earth;

an electronic database that includes detailed airport information that can be accessed by the computer;

receiver for the wireless receipt of data concerning contemporaneous airport traffic; and a selector on the display for enabling a predetermined level of the airport information from the electronic database to be represented on the display, wherein the display is a multifunction display capable of providing a variety of aircraft location and authorized movement guidance information to the aircraft flight crew member, as determined by aircraft location, aircraft heading, and ground movement traffic route information with respect to present aircraft location and ultimate ground operation destination and wherein the display is further capable of displaying contemporaneous airport traffic when data concerning such contemporaneous airport traffic is received.

2. The system of claim 1 wherein the display is a cathode ray tube type head down display.

3. The system of claim 1 wherein the display is a liquid crystal type head down display.

4. The system of claim 1 further including a visual symbol representing the preferred aircraft ground speed.

5. The system of claim 1 wherein the position determination device is a satellite positioning receiver system.

6. The system of claim 5 wherein the satellite positioning receiver system comprises a differential GPS receiver.

7. The system of claim 1 where the position determination device is a terrestrial based positioning system.

8. The system of claim 1 further comprising a ground speed sensor for the aircraft, coupled to the computer.

9. An enhanced method of airport surface movement operation including an on-board aircraft situational awareness system that provides movement clearance information and precise aircraft ground location, comprising the steps of:

Initializing the situational awareness system;

loading electronic airport ground navigational database;

determining present aircraft location;

entering aircraft movement clearance, when received from the airport surface operations controller;

generating and displaying an airport map and aircraft movement guidance symbols, monitoring aircraft location and speed;

calculating preferred ground speed for given aircraft;

displaying preferred ground speed of aircraft;

overlaying other airport traffic on the generated airport surface map;

generating and displaying new guidance information, and repeating the step of updating displayed information, until aircraft transitions to flight or park status.

10. The method of claim 9 further including displaying current aircraft location with respect to current location references.

11. The method of claim 9 further including selecting an amount and type of information to be displayed by the system.

12. The method of claim 9 wherein the step of displaying aircraft movement clearance symbols includes display of a measured ground speed.

13. The method of claim 10 wherein the step of displaying aircraft movement clearance symbols, further includes a symbolic representation of the anticipated aircraft ground location for reaching preferred aircraft ground speed.

14. The method of claim 9 wherein entering aircraft movement clearance is accomplished via a datalink between the aircraft and a ground controller.

15. A system for providing airport surface operation information to an aircraft pilot, comprising:

a display including a symbol generator mounted in an aircraft;

a computer coupled to the display;

a position determination device mounted in the aircraft and coupled to the computer that provides information of the aircraft position with respect to the surface of the earth;

a controller for inputting movement clearance of the aircraft;

an electronic database that includes detailed airport information that can be accessed by the computer that is provided to the aircraft in wireless fashion;

a wireless datalink operable between the aircraft and an authority for broadcasting other airport traffic position operating on the ground within the airport area and airport layout data; and an aircraft speed sensor for providing an input signal to the computer for determining aircraft speed;

wherein the display provides a variety of aircraft location and authorized movement guidance information to the aircraft pilot dependent upon a selected detail view as determined by aircraft flight crew.

16. The system of claim 15 wherein the display is a multi-panel head-own display.

17. The system of claim 15 wherein the position determination device is a satellite positioning receiver system.

18. The system of claim 15 where the position determination device is a terrestrial based positioning system.

19. The system of claim 15 further comprising a ground speed sensor for the aircraft and coupled to the computer.

* * * * *